(12) United States Patent
Echeverri et al.

(10) Patent No.: US 11,409,175 B1
(45) Date of Patent: Aug. 9, 2022

(54) CHOLESTERIC LIQUID CRYSTAL DEVICE

(71) Applicant: Kent Displays, Inc., Kent, OH (US)

(72) Inventors: Mauricio Echeverri, Kent, OH (US); Clinton Braganza, Kent, OH (US); Anthony Daniels, Kent, OH (US)

(73) Assignee: Kent Displays, Inc., Kent, OH (US)

( * ) Notice: Subject to any disclaimer, the term of this patent is extended or adjusted under 35 U.S.C. 154(b) by 0 days.

(21) Appl. No.: 17/321,792

(22) Filed: May 17, 2021

(51) Int. Cl.
*G02F 1/137* (2006.01)
*G02F 1/1347* (2006.01)
*G02F 1/1333* (2006.01)
*G02F 1/1334* (2006.01)

(52) U.S. Cl.
CPC ........ *G02F 1/13718* (2013.01); *G02F 1/1334* (2013.01); *G02F 1/13338* (2013.01); *G02F 1/13478* (2021.01)

(58) Field of Classification Search
CPC ............. G02F 1/13718; G02F 1/13478; G02F 1/13338; G02F 1/1334
USPC ......................................................... 349/12
See application file for complete search history.

(56) References Cited

U.S. PATENT DOCUMENTS

| | | | |
|---|---|---|---|
| 5,437,811 A | 8/1995 | Doane et al. | |
| 5,453,863 A | 9/1995 | West et al. | |
| 6,104,448 A | 8/2000 | Doane et al. | |
| 8,139,039 B2 | 3/2012 | Schneider et al. | |
| 8,228,301 B2 | 7/2012 | Schneider | |
| 9,651,813 B2 | 5/2017 | Morris et al. | |
| 10,558,065 B2 | 2/2020 | Marhefka | |
| 2009/0096942 A1* | 4/2009 | Schneider | G02F 1/13338 349/12 |

* cited by examiner

*Primary Examiner* — Charles S Chang
(74) *Attorney, Agent, or Firm* — Serbinowski PLLC

(57) ABSTRACT

A cholesteric liquid crystal device has an optical response opposite to that of the Prior Art. The liquid crystal device takes advantage of a unique and unusual effect in cholesteric liquid crystals where pressure applied to the device with a pointed stylus, without applying a voltage, creates a transmissive texture as opposed to the planar texture of the Prior Art.

28 Claims, 4 Drawing Sheets

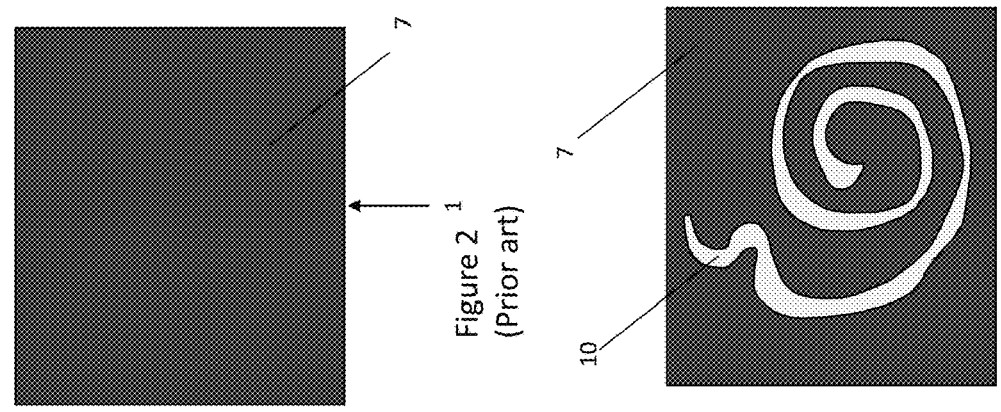
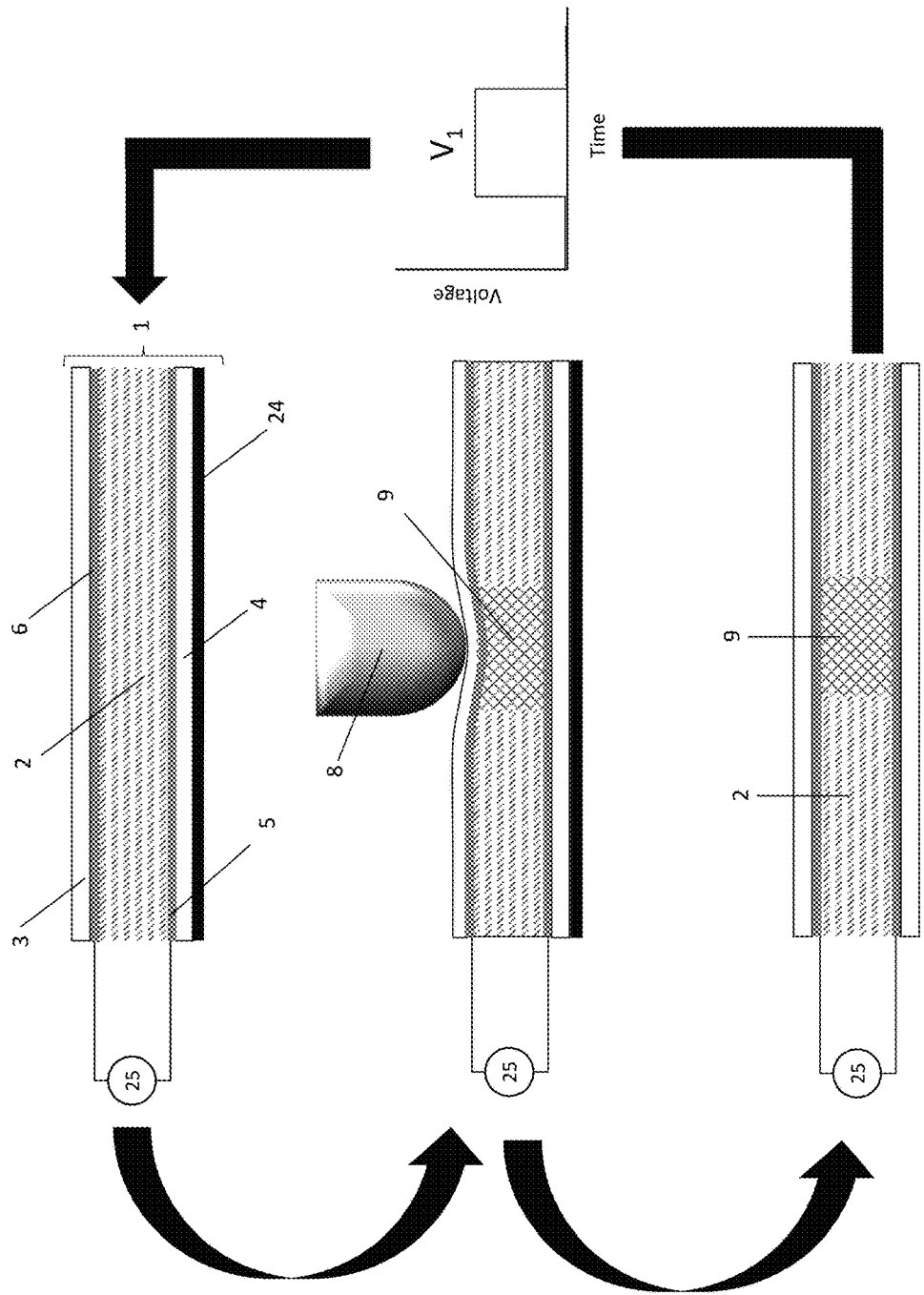
Figure 2 (Prior art)
Figure 3 (Prior art)
Figure 1 (Prior art)

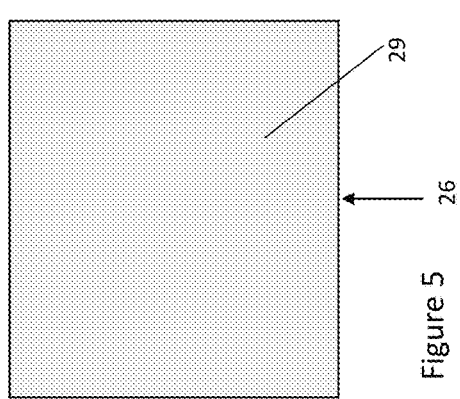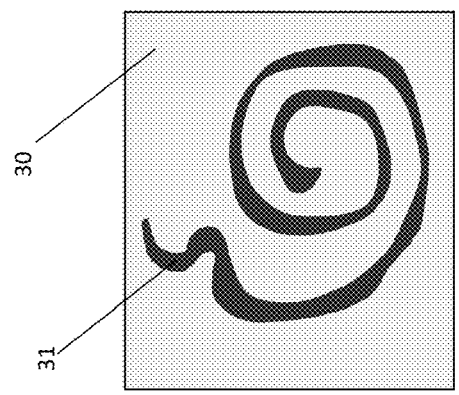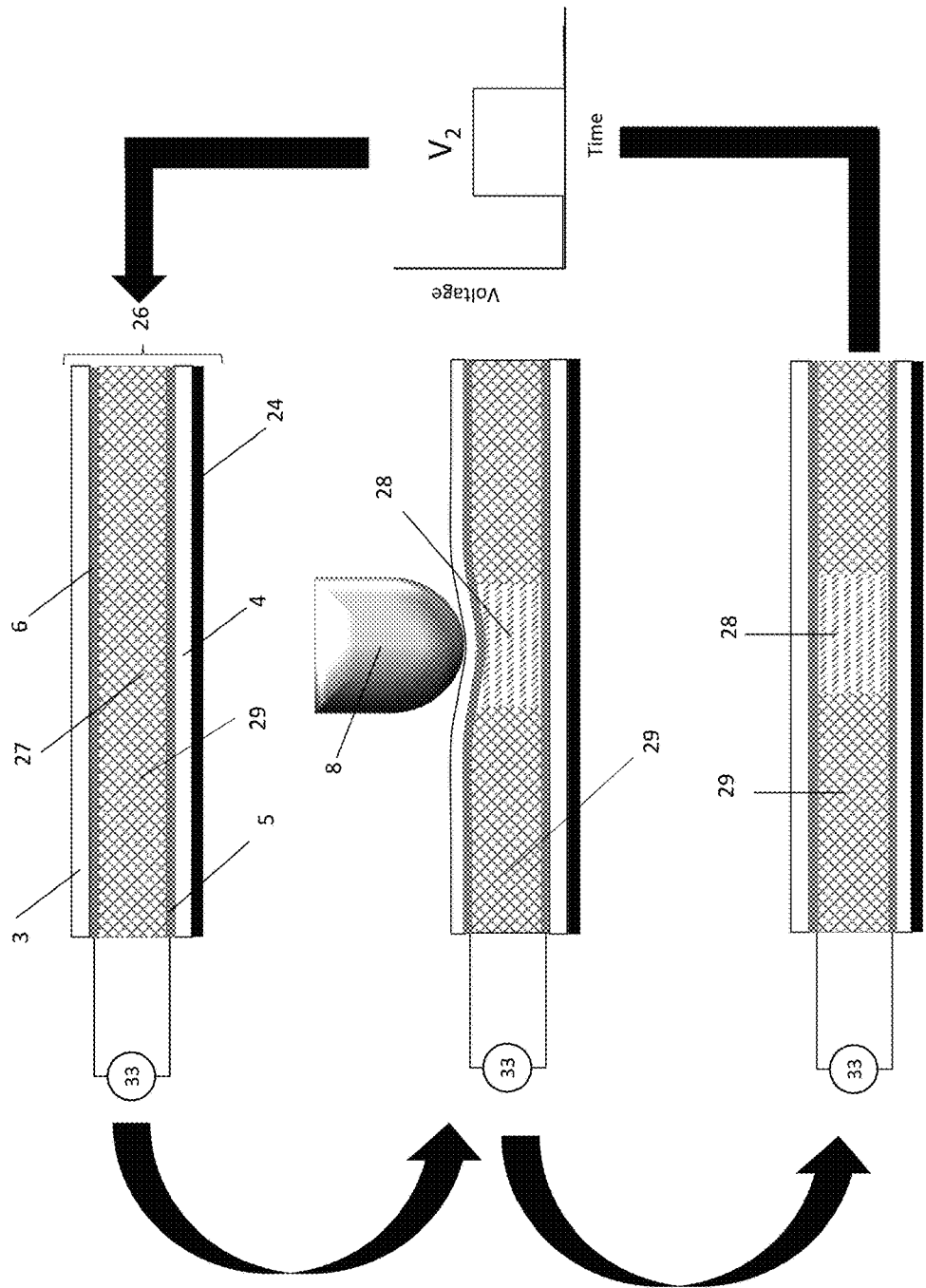

CHOLESTERIC LIQUID CRYSTAL DEVICE

TECHNICAL FIELD

This disclosure relates generally to cholesteric liquid crystal pressure sensitive devices.

BACKGROUND

In an effort to replace paper with a simple low-cost reusable alternative device, Kent Displays Inc. developed the BOOGIE BOARD® writing tablet (see U.S. Pat. Nos. 6,104,448 and 8,139,039 incorporated by reference). As illustrated in FIG. 1, the technology of the BOOGIE BOARD® writing tablet uses a unique feature of cholesteric liquid crystals, wherein the liquid crystal material is suitably sandwiched between two substrates 3 and 4. The front substrate 3 is flexible for forming the writing surface (FIGS. 1-3). In the prior art BOOGIE BOARD® writing tablet the liquid crystal is initially in a generally transmissive texture known as the focal conic texture 2 that allows the user to see the light absorbing background of the device provided by the back substrate 4 or a coating or layer 24 on the back substrate that is usually dark in color. By applying a modest localized pressure with an object 8 on the writing surface the focal conic texture is changed to a reflective texture known as the planar texture 9. The color of the planar texture 9 is determined by the pitch length of the cholesteric liquid crystal. For example, writing on a writing tablet device having a black light absorbing background and cholesteric liquid crystal pitch length tuned to green (550 nm), creates green writing or marks 10 contrasting with the black surroundings 7 of the rest of the writing device where pressure has not been applied. The image is erased to form a clean page by initializing the writing device to the generally transmissive or focal conic texture. To do so, one applies voltage 25 (see, for example, U.S. Pat. No. 10,558,065 which is incorporated by reference) to transparent electrodes 5 and 6 on the inner surface of the substrates in response to pushing a button on the writing tablet. Both the focal conic and planar textures are stable and require no voltage to be maintained. The only voltage that is used is an erasing voltage pulse applied to the electrodes that transitions all the liquid crystal layer, including the planar texture of marks 10, to the focal conic texture.

A drawback of BOOGIE BOARD® writing tablets is that it is only possible to write a reflective line or mark on a darker light absorbing background, without application of voltage during the writing. This is because in the prior art, pressure applied to a cholesteric liquid crystal writing tablet can only be made to drive it to the reflective planar texture. As a result, to maximize contrast of prior art writing tablets the options for a light absorbing background are limited to colors and tones that have a significant amount of light absorption. This set of conditions limits the type of contrast combinations that are possible between the planar mark and the transmissive surroundings. Further, this mode in which BOOGIE BOARD® writing tablets operate does not allow for making a dark line or mark having white reflective surroundings without applying voltage, and so cannot approximate the writing in typical paper notebooks, notepads and whiteboards. In a more general sense, dark writing on bright backgrounds is not possible using this mode known as Mode B. In an attempt to overcome these limitations, Schneider et al. in U.S. Pat. No. 8,139,039 proposed the application of a small continuous voltage to a typical writing tablet initialized to the planar reflective texture while applying a localized pressure on the writing surface transforming the cholesteric liquid crystal from planar to a more transmissive texture (known as Mode A). However, the need for a constant applied voltage during the entire writing process is a serious drawback and defeats one of the most important advantages of bistable cholesteric liquid crystals—forming images without using voltage. The Schneider et al. technique was therefore commercially useful for partially erasing images as opposed to writing them.

SUMMARY OF THE DISCLOSURE

This disclosure describes, for the first time, a liquid crystal device in which applied pressure drives the liquid crystal to a transmissive texture, as opposed to the color reflective planar texture of the prior art, and does so without any applied voltage. One can make a dark mark or writing of a transmissive texture where pressure is applied, whereby surroundings of a reflective texture exist where pressure is not applied. Even black writing having white surroundings is possible, which was not possible before. The liquid crystal device comprises a liquid crystal layer including cholesteric liquid crystal material disposed between a first substrate and a second substrate. There are two optional first and second electrically conductive layers. The first electrically conductive layer is disposed between the first substrate and the liquid crystal layer and the second electrically conductive layer is disposed between the second substrate and the liquid crystal layer. The first substrate, when it is a front substrate, and the first electrically conductive layer are transparent and flexible and the second substrate, when it is a back substrate, and the second electrically conductive layer can be transparent, semitransparent or opaque depending upon the desired background. Applying a suitable voltage pulse or pulses to both electrically conductive layers initializes the cholesteric liquid crystal to a reflective texture.

A localized pressure on the first substrate, such as from the tip of a stylus or fingernail, creates a mark or writing on the device of a transmissive texture, which contrasts with the reflective texture that exists where pressure was not applied. The image includes marks formed of the transmissive texture, which allows light to pass through the liquid crystal layer to be partially or almost entirely absorbed by a light absorbing background. There are surroundings where pressure was not applied, the surroundings including the reflective texture. As defined herein and used throughout this disclosure, the reflective texture is not completely reflective and the transmissive texture is not completely transmissive. The reflective texture permits some light to be transmitted through it and some light reflected. The transmissive texture is partially transmissive and weakly scattering of incident light. The reflective texture reflects substantially more light than light that is weakly scattered by the transmissive texture. One can see through the transmissive texture to the light absorbing background. Therefore, if the back substrate is black, the localized pressure creates a dark mark that contrasts with the color of the reflective texture of the rest of the device where pressure was not applied (the surroundings), color of the surroundings depending on the pitch length of the cholesteric liquid crystal. The dark mark includes the transmissive liquid crystal, enabling one to see, for example, the underlying black substrate through the liquid crystal layer. In one example, the surroundings may be referred to as bright and the mark may be referred to as dark, relative to one another. Of course, this does not require a high level of brightness of the surroundings or a high level of darkness of the mark, only that the mark contrasts with the surroundings. When using a color light absorbing background, both the mark and the surroundings may be seen as selected colors. The color light absorbing background does not need to be a uniform color and may include, for example, patterns, grids or display images for the light absorbing background or behind it.

To fully erase the image, a suitable voltage pulse is applied to the electrically conductive layers driving the cholesteric liquid crystal across the entire writing surface to the reflective texture including the previously pressured areas.

When the liquid crystal device has been completely erased the cholesteric liquid crystal material across the entire writing surface or screen is in the reflective texture. This can be referred to as an initial texture of the liquid crystal device or an initialized liquid crystal device.

In one embodiment the user is located proximal to the first or front substrate upon which pressure is applied, and the light absorbing background absorbs light passing through the liquid crystal layer. The light absorbing background and the second or back substrate are more distal to the user than the front substrate is to the user. In one embodiment, the second substrate may be flexible; one can flip the device over while the user remains in the same position and the user can apply pressure to the second substrate in which case the user would be more proximal to the second substrate than to the first substrate. The word substrate is used as a generic term in this disclosure that includes not only the main material of the bulk of the films but also any coating or treatment on their surfaces.

Turning now to a general first aspect of the disclosure, featured is a liquid crystal device including a first substrate and a second substrate that are spaced apart from each other, the first substrate being transparent and flexible. A liquid crystal layer is disposed between the first substrate and the second substrate. The liquid crystal layer includes cholesteric liquid crystal material. The cholesteric liquid crystal material is adapted to enable pressure applied by a user to the first substrate, without application of voltage, to change at least a portion of the cholesteric liquid crystal material from a reflective texture to a transmissive texture to form an image.

Referring now to specific features of the first aspect, the liquid crystal device includes a light absorbing background that absorbs light passing through the liquid crystal layer. In another specific feature the light absorbing background is comprised of a coating or layer on the second substrate. In yet another feature, the light absorbing background is opaque or semitransparent. Still further, the light absorbing background may include an opaque or semitransparent second substrate.

In another feature the second substrate is flexible and pressure applied by the user to the second substrate changes at least a portion of the cholesteric liquid crystal material from the reflective texture to the transmissive texture.

In another feature the liquid crystal device includes a first electrically conductive layer disposed between the first substrate and the liquid crystal layer and a second electrically conductive layer disposed between the second substrate and the liquid crystal layer. In particular, the liquid crystal device may include electronic circuitry adapted to apply an erase voltage to the first electrical conductive layer and the second electrically conductive layer, wherein the electronic circuitry is an integral part of the liquid crystal device. Yet another variation is a combination of the liquid crystal device of the first aspect and a separate erasing device that is not permanently connected to the liquid crystal device, the separate erasing device comprising electronic circuitry adapted to apply an erase voltage to the first electrical conductive layer and the second electrically conductive layer. In another feature the image is erased by applying a voltage to the electrically conductive layers that places the cholesteric liquid crystal material into the reflective texture. In yet another feature there is a cell gap between the first electrically conductive layer and the second electrically conductive layer that ranges in size from about 2 microns to about 4 microns.

Another feature is that the cholesteric liquid crystal material comprises cholesteric liquid crystal dispersed in polymer.

Still another feature is that the liquid crystal device includes a second liquid crystal layer stacked over the liquid crystal layer. In particular, the second liquid crystal layer is sandwiched between electrically conductive layers. As another feature, the liquid crystal device may include at least one middle substrate disposed between the liquid crystal layer and the second liquid crystal layer. Yet another feature is that the second liquid crystal layer includes second cholesteric liquid crystal material and the cholesteric liquid crystal material and the second cholesteric liquid crystal material have opposite chiral handedness. Another feature is that the second liquid crystal layer includes second cholesteric liquid crystal material, and the cholesteric liquid crystal material and the second cholesteric liquid crystal material have different pitch lengths. Another feature is that the liquid crystal device includes a third electrically conductive layer between the middle substrate and the second liquid crystal layer and a fourth electrically conductive layer between the second substrate and the second liquid crystal layer.

Other features relate to erasing the liquid crystal device by flexing the device in various ways. In this regard, the liquid crystal device includes a first electrically conductive layer disposed between the first substrate and the liquid crystal layer and a second electrically conductive layer disposed between the second substrate and the liquid crystal layer. In one feature the image is erased partially or entirely by flexing that occurs by rolling or scrolling the liquid crystal device. In another feature the image is erased partially or entirely by flexing that occurs by shaking or flapping the liquid crystal device. Another feature is that the image is erased partially or entirely by flexing that occurs by twisting the liquid crystal device. In another feature the image is erased partially or entirely by flexing that occurs by crumpling the liquid crystal device. Another feature is that the image is erased partially or entirely by flexing that occurs by removing the liquid crystal device from contact with an object.

Still further, the liquid crystal device may include a stylus that applies the pressure.

In a second aspect, a liquid crystal device includes a first substrate and a second substrate that are spaced apart from each other, the first substrate being flexible and transparent. A liquid crystal layer is disposed between the first substrate and the second substrate. The liquid crystal layer includes cholesteric liquid crystal material. The liquid crystal device includes a light absorbing background that absorbs light passing through the liquid crystal layer. The cholesteric liquid crystal material is adapted to enable pressure applied by the user to the first substrate, without application of voltage, to form a mark that appears dark where pressure is applied, whereby surroundings appear bright where pressure is not applied.

Referring to specific features of the second aspect, the liquid crystal device includes a first electrically conductive layer disposed between the first substrate and the liquid crystal layer and a second electrically conductive layer disposed between the second substrate and the liquid crystal layer. In another feature the liquid crystal device includes electronic circuitry adapted to apply an erase voltage to the first electrical conductive layer and the second electrically conductive layer. The electronic circuitry is an integral part of the liquid crystal device. Another feature is a combination of the liquid crystal device of the second aspect and a separate erasing device that is not permanently connected to the liquid crystal device. The separate erasing device includes electronic circuitry adapted to apply an erase voltage to the first electrical conductive layer and the second electrically conductive layer.

In another feature of the second aspect, the second substrate is flexible and pressure applied by the user to the second substrate changes at least a portion of the cholesteric liquid crystal material from the reflective texture to the transmissive texture.

It should be understood that the above Summary of the Disclosure describes embodiments of the disclosure in broad terms while the following Detailed Description describes embodiments of the disclosure more narrowly and presents specific embodiments that should not be construed as necessary limitations of the invention as broadly defined in the claims. Many additional features, advantages and a fuller understanding of the disclosure will be had from the accompanying drawings and the Detailed Description that follows.

BRIEF DESCRIPTION OF THE DRAWINGS

FIG. 1: Cross-sectional views of a typical writing tablet of the Prior art showing the drawing and erasing operations;

FIGS. 2 and 3: Front views of the typical Prior art writing tablet of FIG. 1 showing the drawing and erasing operations;

FIG. 4: Cross-sectional views of a liquid crystal device of this disclosure showing the drawing and erasing operations;

FIGS. 5 and 6: Front views of the liquid crystal device of FIG. 4 showing the drawing and erasing operations;

DETAILED DESCRIPTION

Figure 7:
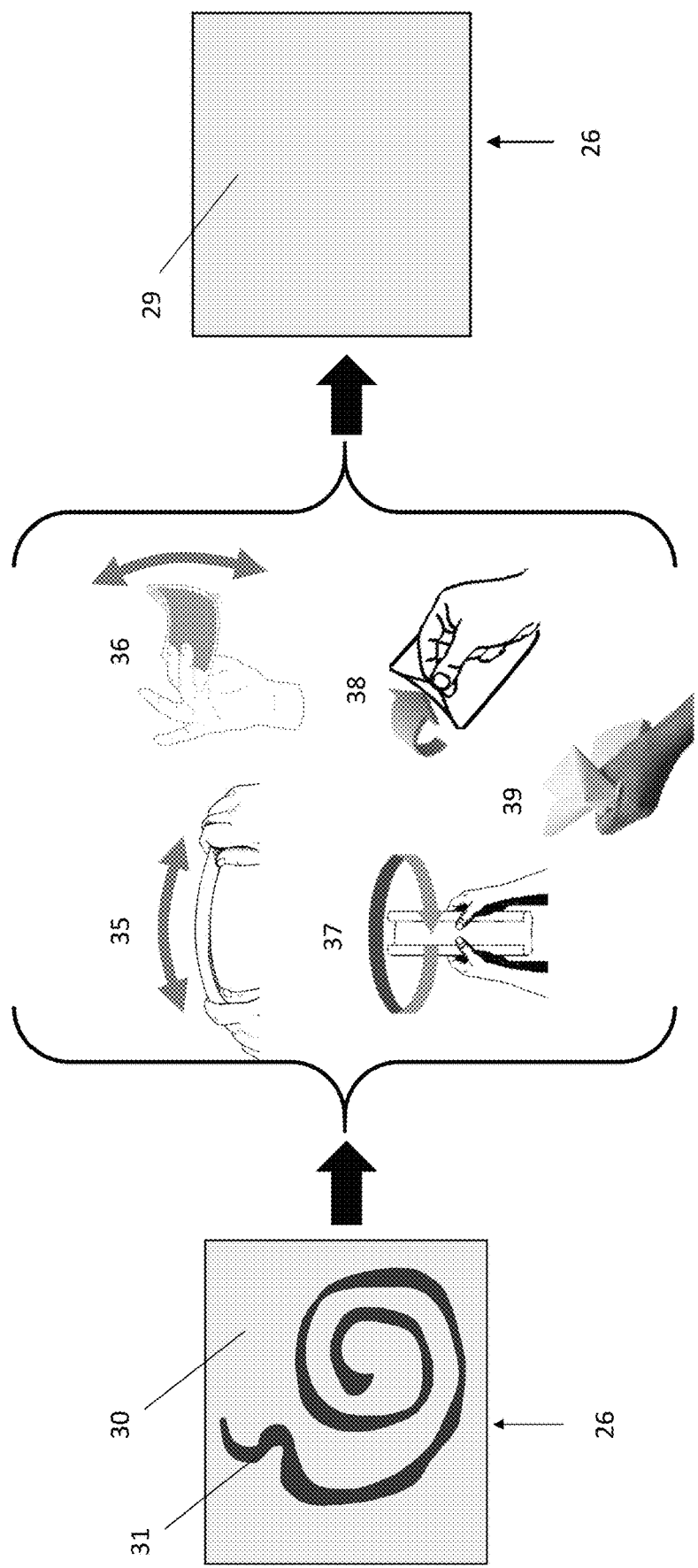
FIG. 7: Front views of the liquid crystal device of this disclosure showing erasing by flexing the device in various ways.

FIGS. 4-6 depict, not to scale, a cross-section of a liquid crystal device 26 that comprises a first or front substrate 3 that is flexible and a second or back substrate 4 that is optionally flexible. The first substrate 3 and the second substrate 4 are spaced apart from each other. A liquid crystal layer 27 is disposed between the first substrate and the second substrate. The liquid crystal layer 27 includes cholesteric liquid crystal material. The front substrate 3 is transparent. The back substrate 4 can be transparent, or it can be semitransparent, opaque, or multicolored to serve as a light absorbing background. An optional light absorbing background 24 absorbs light passing through the liquid crystal layer 27. The light absorbing background 24 can be coated or laminated on the back substrate 4. If the back substrate 4 is light absorbing then a separate light absorbing background 24 may be omitted. The optional second electrically conductive layer 5 and the optional first electrically conductive layer 6 are spaced apart and the cholesteric liquid crystal layer 27 is disposed between them. The first electrically conductive layer 6 is disposed between the first substrate 3 and the liquid crystal layer 27 and the second electrically conductive layer 5 is disposed between the second substrate 4 and the liquid crystal layer 27. There is a cell gap or distance between the spaced apart first electrically conductive layer 6 and the second electrically conductive layer 5 (or between adjacent substrates if no electrically conductive layers are used). Spacers are disposed within the cell gap having a size that approximates the cell gap. In particular, the cell gap has a size in a range of about 2 microns to about 4 microns, most specifically about 2 microns in size. In one example, the first electrically conductive layer 6 and the second electrically conductive layer 5 can be adjacent to the liquid crystal layer 27 and more specifically can be formed as two coatings, respectively, one on the first substrate 3 and one on the second substrate 4, respectively.

A person having ordinary skill in the art would realize in view of this disclosure that the liquid crystal device 26 is not limited by the presence or absence of a polymer layer or other material in the liquid crystal layer 27, or by material present or absent between the liquid crystal layer 27 and the first electrically conductive layer 6 or between the liquid crystal layer 27 and the second electrically conductive layer 5, by material between the first electrically conductive layer 6 and the first substrate 3 or between the second electrically conductive layer 5 and the second substrate 4, or by the presence or absence of a material on the outer surfaces of the first substrate 3 and the second substrate 4, and covers all variations thereof. The first electrically conductive layer 6 disposed adjacent to the first substrate 3 can be transparent, whereas the second electrically conductive layer 5 disposed adjacent to the second substrate 4 can be transparent, semitransparent or opaque. The electrically conductive layers 5 and 6 might or might not be the same as each other and they may be unpatterned or patterned.

The writing surface of the liquid crystal device 26 in the embodiment shown in FIGS. 4-6 is on the front (first) substrate 3 where the first substrate is more proximal to the user than the back (second) substrate 4 is to the user. The first substrate 3 may include various layers on it, for example, an anti-glare coating and a scratch resistant coating. On the other hand, the liquid crystal device can be flipped over while the user remains in the same position and one can write on the second substrate 4 as the writing surface that is more proximal to the user than the first substrate 3 is to the user. In the flipped liquid crystal device 26 one might relocate the light absorbing layer to the other side of the liquid crystal layer 27 (i.e., more distal to the user than the liquid crystal layer is to the user) if writing on the second substrate 4. This could be by permanent design or temporary design as in the case of using a removable light absorbing background 24 that could be moved from one to the other substrate.

The cholesteric liquid crystal material of the liquid crystal layer 27 is adapted to have its initial state in the reflective texture 29 so that in the front view the screen or writing surface of the liquid crystal device 26 appears entirely as a reflective color determined by the pitch of the cholesteric liquid crystal in combination with the reflection spectra of the layers 4 and light absorbing background 24 (FIG. 4, upper drawing, and FIG. 5). The liquid crystal device 26 is designed so that a local deformation caused by pressure applied by an external object 8 on the front substrate 3, deforms the front substrate 3, changing at least a portion of the cholesteric liquid crystal texture from the reflective texture 29 to a transmissive texture 28. A mark 31 is made comprising a region of the liquid crystal material in the transmissive texture 28 (FIG. 6). There are surroundings 30 where pressure was not applied, comprised of one or more regions of the reflective liquid crystal material 29 to form an image (FIG. 4, middle and bottom drawings, and FIG. 6). It is significant that this process does not need any voltage to be applied in order to create the image, making formation of the transmissive texture a phenomenon that has never been utilized before in liquid crystal devices, to the knowledge of the inventors. The transmissive texture 28 created by the local deformation remains even after the deformation is completed, allowing more ambient light to go through the region of the deformation, i.e., the region of liquid crystal comprising the mark 31, than through the surroundings 30 of the reflective texture where pressure was not applied. Light passing through the transmissive texture 28 is absorbed and/or reflected by the layers 4 and/or 24.

While not wanting to be bound by theory, polarizing microscope studies of the transmissive texture 28 indicate similarities to the classic focal conic texture but they are not necessarily identical. The light absorbing background 24 will absorb most light going through the region of the transmissive texture 28 of the liquid crystal layer 27 where local pressure was applied. The undeformed areas of the display screen or writing surface (the surroundings 30) remain in the reflective texture 29 (appearing bright), reflecting some of the ambient light following the circular polarization properties of cholesteric liquid crystals in the planar texture. The mark 31 which is less bright or dark, contrasts with the bright surroundings 30. The result in a front view of the liquid crystal device is a visible mark 31 in contrast to the surroundings 30 (FIG. 6). The mark 31 may be black or a color or shade thereof that contrasts with the planar texture of the surroundings 30.

For example, if the cholesteric liquid crystal pitch length is tuned to a green color with a transparent back substrate 4 and including an optional black light absorbing background 24, the resulting appearance of the device in front view will be a more or less black mark 31 (a dark mark) and green surroundings 30 around the mark 31 (FIG. 6). The black light absorbing background 24 will absorb most light going through the region of the transmissive texture 28 of the liquid crystal layer 27 where local pressure was applied.

More specifically, the cholesteric liquid crystal in the liquid crystal layer can be initialized to the reflective texture. The reflective texture is formed by some or all cholesteric liquid crystal domains with helix axis orientation distribution mostly perpendicular to the substrate's plane which allows selective light reflection following Bragg's law as is well known in the prior art of liquid crystal materials. This configuration is often referred to as a planar texture. A localized pressure made by a stylus or other object on the device surface changes the generally bright reflective texture to a transmissive texture, only in the regions where the localized pressure was applied. The transmissive texture allows light to partially transmit through and interact with the opposite layers of the device. This transmissive texture resembles a focal conic texture but may not be the same as that texture. In the focal conic texture the cholesteric liquid crystal of some or most of the domains' helix axes are distributed more in a random orientation allowing more light to transmit and scatter through the transitioned areas to be absorbed and/or reflected by a light absorbing background in back of the liquid crystal layer remote from the writing surface (see U.S. Pat. No. 6,104,448 incorporated by reference). Ambient light interacts differently with both the reflective and transmissive textures creating an image with good contrast. The image will remain permanently until the device is erased in sections or entirely.

The object 8 can be a stylus, fingernail or any force creating entity that can cause a localized deformation of the front substrate 3. The object 8 can be a solid object, but as a force creating entity it can be localized pressure caused by liquid or gaseous jets. The liquid crystal layer 27 can comprise cholesteric liquid crystal dispersed in polymer, with or without additives.

While not wanting to be bound by theory and understanding that an inventor need not explain the mechanism behind an invention, the effect of applying localized pressure to the front substrate 3 that changes the cholesteric liquid crystal from the reflective texture to a transmissive texture, is surprisingly opposite that of prior art. It is to be noted that the effect can be made to occur using exactly the same cholesteric liquid crystal as disclosed in the prior art (see for example U.S. Pat. No. 8,228,301). The effect, however, can be made to occur by either changing the polymer formulation (see Example 1) of the dispersed polymer in the cholesteric liquid crystal dispersion or by adding a non-reactive additive such as mineral oil to prior art dispersion materials (Example 2). In both formulations of Examples 1 and 2, the effect occurs when the spacing between the first or front substrate 3 and the second or back substrate 4 is in a range of about 2 um to about 4 um. In some cases, increasing the surface energy of surfaces of the substrates that are nearest to the cholesteric liquid crystal material improves the effect. For example, variations in UV/Ozone substrate surface treatment can be made that increase the substrate surface energy. A person having ordinary skill in the art will be able to make modifications to the features in the examples, without undue experimentation, to arrive at other cholesteric liquid crystal materials or devices which have the same properties described in the claims of this disclosure. Variations of the formulations of Examples 1 and 2 can occur, for example, by using different initiator, cross-linker, monomer, cholesteric liquid crystal compounds or nematic liquid crystal compounds. For example, modifications intended to increase contrast or change line width may be made to the formulations while remaining within the scope of this disclosure. Different processing conditions such as curing irradiance and curing time can be used to obtain a device with the properties described in this disclosure. These compositional, structural and processing changes create a system that responds differently to different types of forces. A localized compressive force promotes the transmissive texture that creates contrast with the reflective surroundings. While not wanting to be bound by theory, it is believed that the polymer morphology and/or the plasticizing effect of non-reactive materials may affect the rheological behavior of the liquid crystal so it flows differently depending on the force being applied allowing the liquid crystal molecules to rearrange into different textures when relaxing after flow is finished.

In one embodiment, the electrically conductive layers 5 and 6 can be connected to electronic circuitry 33 adapted to apply an appropriate voltage pulse $V_2$ that refreshes the entire device (i.e., erases the entire viewing area, screen or writing surface) to the initial reflective texture 29 (FIGS. 4 and 5), creating a new full page upon which to write again. The electronic circuitry 33 does not have to be permanently attached to the device. For example, the electronic circuitry 33 could be a separate unit from the liquid crystal device which the liquid crystal device periodically electrically engages when erasing is desired (see U.S. Pat. No. 9,651,813 which is incorporated by reference). The voltage profile needed to drive the cholesteric liquid crystal to the reflective or planar texture obeys the well-known electro-optical transition mechanisms of cholesteric liquid crystals (U.S. Pat. Nos. 5,437,811 and 5,453,863, which are incorporated herein by reference). A suitable voltage pulse or pulse sequence provided by erase circuitry 33 to drive the cholesteric liquid crystal to the reflective or planar texture is sufficient to erase a written image and refresh or initialize the device. As in the embodiments described above, a constant voltage need not be applied to maintain the reflective texture or the transmissive texture.

In another embodiment, the liquid crystal layer is adapted so suitable mechanical flexing of the liquid crystal device 26 will initialize the cholesteric liquid crystal material to the reflective texture 29 as well as erase a written image, enabling the liquid crystal device 26 to be reused. In this regard, the device includes the first electrically conductive layer and the second electrically conductive layer on either side of the liquid crystal layer, so that erasing may still occur electronically. The operation of flexing of the liquid crystal device provides an alternative way of erasing the liquid crystal device instead of applying voltage. When flexing the device to erase it the electrically conductive layers are flexed along with the rest of the device. When one wants to write on the liquid crystal device 26 (after flex erasing or not) and to erase this by applying voltage, that is also possible. FIG. 7, left side view, shows a schematic front view of the liquid crystal device 26 including the light transmissive mark 31 and the bright reflective texture of the surroundings 30 around the mark 31. FIG. 7, right side view, shows the liquid crystal device in its initial state in which the entire writing surface shows the reflective texture.

Different modes of flexing can be applied to the written-on liquid crystal device to achieve full erasing of the image. Full erase to the reflective texture employs ripples of flexural stress traveling across the flexible device. FIG. 7 shows different ways of flexing the liquid crystal device for erasing wherein the liquid crystal device is changed from having writing or marks 30 of the transmissive texture with the surroundings 31 around the mark in the reflective texture (left side view), to the entire writing surface of the device 26 being in the reflective texture 31 as an initial state (right side view). For example, one can flex the liquid crystal device 26 by holding it with both hands and bending it (bend to erase 35). In another example, the liquid crystal device 26 may be flexed by shaking the device until erasing is achieved (shake to erase 36). If the substrates are suitably thin, the liquid crystal device 26 can be rolled inwards and/or outwards flexing the entire device area permitting useful applications such as scrolls that erase the writing or drawing when rolled in and out (roll to erase 37). Flexing across the liquid crystal device area can also be achieved by peeling the flexible device from an object that it contacts (peel to erase 38). There are many other examples of flexing of the substrates that can be used to achieve full erasing such as torsion and twisting, even crumpling (39).

The erasing sensitivity can also be tuned. This means that the erasing process could require from one to several cycles of the selected bending mode to be complete. Again, this depends on the application. For instance, a peel to erase application may utilize full erase that happens at the first attempt of removing the flexible device from the surface on which it is attached. On the other hand in other applications several bends or shakes may be needed to completely erase the liquid crystal device, which is desirable to prevent accidental erasing.

The multilayer liquid crystal device 26 may be flexible, for example, when the liquid crystal device is designed to be erased by flexing. Of course, this does not prevent the liquid crystal device from including inflexible elements so long as they do not prevent erasing by flexing the multilayer liquid crystal device. In one example, the back substrate could be a thicker element that enables less flexing of the multilayer liquid crystal device but still enough to enable the flexing to erase it. Sides of the liquid crystal device can be sealed in ways known to those having ordinary skill in the art including, but not limited to, sealing gaskets and laser singulation. For example, such sealing prevents delamination when the liquid crystal device is flexed to erase it. In another example, the liquid crystal device might include an inflexible frame or bezel but still enables flexing that erases it. On the other hand, the liquid crystal device 26 may be partially inflexible, such as when not being designed to employ flexing to erase it.

Figure 8B:
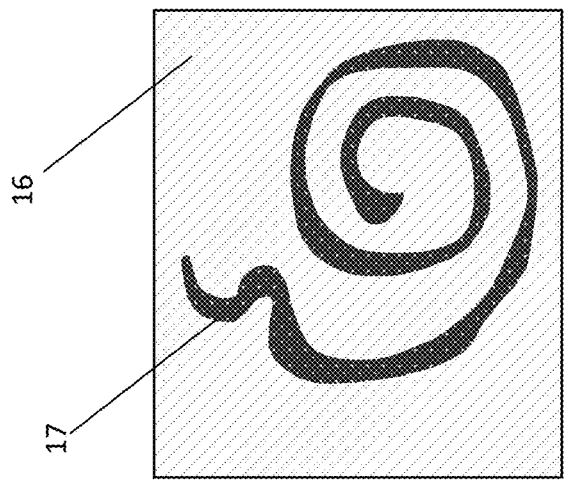
FIGS. 8A and 8B: Cross section and front views of an embodiment with two stacked layers of cholesteric liquid crystal material.
Figure 8A:
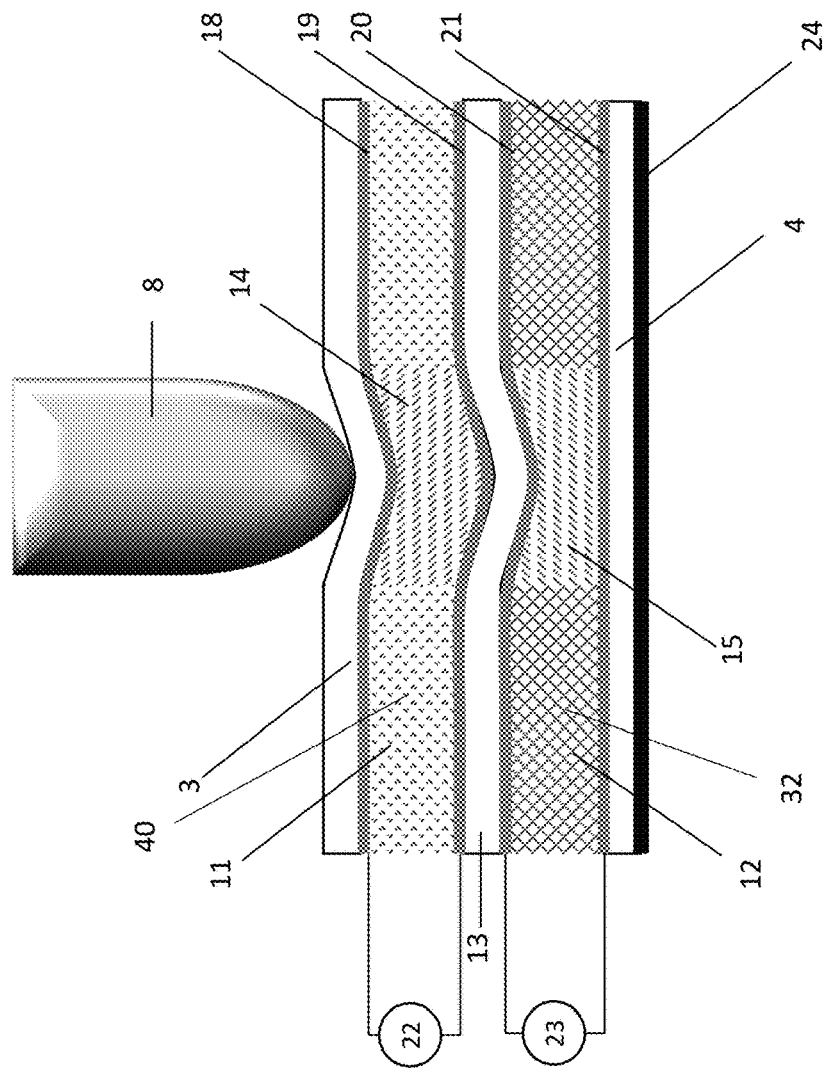

A stacked liquid crystal layer embodiment is depicted in FIGS. 8A and 8B. In this structure, two or more layers of cholesteric liquid crystal material (a first liquid crystal layer 11, and a second liquid crystal layer 12) can be stacked and share one common transparent middle substrate 13 that is flexible. Alternatively, the middle substrate 13 can be replaced by two optically coupled, flexible transparent or semitransparent substrates. The front of first substrate 3 serves as a flexible writing surface whereas the back or second substrate 4 and optional coating of the light absorbing layer 24 functions as background depending on the reflective/absorptive characteristics of their combined effect. The stacked device includes electrically conductive layers 18, 29, 20, 21. The first electrically conductive layer 18 is located between the first substrate 3 and the liquid crystal layer 11; the second electrically conductive layer 19 is located between the middle substrate 13 and the liquid crystal layer 11; the third electrically conductive layer 20 is located between the middle substrate 13 and the second liquid crystal layer 12; and the fourth electrically conductive layer 21 is located between the second substrate 4 and the second liquid crystal layer 12. The liquid crystal layer 11 is disposed in the cell gap between the electrically conductive layers 18, 19 and the second liquid crystal layer 12 is disposed in the cell gap between the electrically conductive layers 20, 21. The cholesteric liquid crystal materials of the first liquid crystal layer 11 and the second liquid crystal layer 12 are engineered so that a localized pressure exerted by a moving or stationary object 8 creates a local deformation on the front substrate 3 and on the intermediate substrate(s) 13, changing the reflective textures 40, 32 of both liquid crystal layers 11, 12 where pressure was not applied into regions of the transmissive textures 14, 15 where local pressure was applied. The regions of the transmissive textures 14 and 15 might or might not be the same. The regions of transmissive textures 14 and 15, and the regions of the planar textures 40, 32, are stable in absence of an electric field. The reflective textures 40, 32 have reflective colors intrinsic to the cholesteric liquid crystal material and dependent upon its pitch lengths, which is affected by any color of the layers 4 and light absorbing background 24 observed in a front view (FIG. 8B). A mark 17 formed of the transmissive texture contrasts to the bright mixing of regions of the reflective colors of reflective textures 40 and 32 illustrated by surroundings 16 in the reflective texture in FIG. 8B. When in the transmissive textures, the regions 14, 15 enable one to see the second substrate 4 and/or any light absorbing background 24. The reflective color of the reflective (e.g., planar) texture 40 in first liquid crystal layer 11 mixes with the reflective color of the reflective (e.g., planar) texture 32 in the second liquid crystal layer 12, and is also affected by color from layers, displays, patterns or the like, below the liquid crystal layer 12 (such as colored light absorbing background 24). The regions of the reflective textures 40, 32 are undepressed regions where pressure was not applied. Another example is that the light absorbing background 24 is a semitransparent layer. The stacked multilayer liquid crystal device may be flexible. This does not prevent inflexible elements or components from being used in the device, as described above for the liquid crystal device 26.

An advantage of this type of construction is that by combining the optical properties of multiple layers it is possible to achieve effects that are difficult or impossible with one layer. For instance, first and second liquid crystal layers 11 and 12 could contain cholesteric liquid crystals with the same pitch length (same color) but with opposite chiral handedness, resulting in a total reflectance higher than 50% which is the theoretical limit of one single layer. First and second liquid crystal layers 11 and 12 could have different colors that would additively mix to provide a color that could not be achieved by one layer alone. For example, a liquid crystal device including a blue first liquid crystal layer 11 and a yellow second liquid crystal layer 12, when in the reflective textures, undergoes additive mixing of these colors to provide a broader wavelength approaching the appearance of a white background, which is desired in certain applications. The presence of electrically conductive layers 18, 19, 20 and 21 permits the application of a suitable voltage as provided by electronic erase circuitry 22 and 23 that transform all of the first and second liquid crystal layers 11 and 12 to the reflective texture including the previously written regions of transmissive textures 14 and 15 to initialize the device in the manner explained in FIG. 4. The erase circuitry 22, 23 need not be part of the stacked liquid crystal device but could be part of a separate erasing device that is not permanently attached to the stacked liquid crystal device.

The disclosure now presents particular Examples, which should not be used in any way to limit the subject matter as defined in the claims.

Example 1

Mixture a Ingredients and Preparation

A composition including the following components were vortex mixed in an amber vial: 0.39% w/w Irgacure 819 purchased from IGM resins; and 2.23% w/w methyl methacrylate, 4.60% w/w bisphenol A ethoxylate diacrylate, 6.16% w/w di(ethylene glycol) 2-ethylhexyl ether acrylate, 0.66 w/w % 2-hydroxyethyl methacrylate, all being purchased from Sigma-Aldrich. Added to the vial were 18.82% w/w MDA-00-3506 nematic liquid crystal and 66.97% w/w MDA-00-1955 Cholesteric Liquid Crystal, both obtained from Merck. Mechanical stirring was used until a clear solution was obtained. 0.2% w/w 2 um plastic spacers purchased from Nanomicro were added to the mixture and dispersed by ultrasound. The components were based on the total weight of the composition.

Liquid Crystal Device Fabrication

A transparent 5 mil Polyethylene Terephthalate (PET) film and a transparent 7 mil PET film were treated with UV ozone and coated with conductive polymer PEDOT:PSS S300 from AGFA to obtain a sheet resistance between 150 $\Omega$/sq and 800 $\Omega$/sq. Mixture A was laminated between these films with the conductive polymer sides adjacent to the mixture. The lamination conditions were set so that a cell gap of approximately 2 um was achieved. A UV lamp was used to cure the reactive mixture through the 5 mil substrate. After curing, the PET on the opposite side of the curing was coated with black ink.

Liquid Crystal Device Operation

A 50 Vrms, square wave at 20 Hz as is well known in the art was applied to the device to drive the liquid crystal to its initial reflective state. Applying direct pressure with an object on the clear 5 mil PET side reduced the reflectance of the deformed area and formed a transmissive mark in the liquid crystal layer having higher transmission through the cholesteric liquid crystal material layer than the undepressed reflective portions of the display screen. The black ink layer absorbs the light that passes through the mark, creating contrast with the surroundings in the reflective texture of the non-deformed areas. To refresh the device back to its initial reflective texture, a 50 Vrms square wave at 20 Hz was applied.

Example 2

Mixture B Ingredients

A composition including the following components were vortex mixed in an amber vial: 0.47% w/w Irgacure 651 from IGM resins; and 19.25% w/w methyl methacrylate, 3.47% w/w trimethylolpropane triacrylate, 0.40% lauryl methacrylate, all purchased from Sigma-Aldrich. Added were 14.86% w/w MDA-00-3506 and 55.90% w/w MDA-01-1955, both obtained from Merck, 0.94% w/w of 4 um spacers from Nanomicron and 4.71% of mineral oil, CVS brand. The mixture was further blended with ultrasound for 20 minutes.

Liquid Crystal Device Fabrication

A transparent 5 mil Polyethylene Terephthalate (PET) film and a transparent 7 mil PET film were treated with UV ozone and coated with conductive polymer PEDOT:PSS S300 from AGFA to obtain a sheet resistance between 150 $\Omega$/sq and 800 $\Omega$/sq. Mixture B was laminated between these films with the conductive polymer sides adjacent to the mixture. The lamination conditions were set so that a cell gap of approximately 4 um was achieved. A UV lamp was used to cure the reactive mixture adjacent to and through the 5 mil substrate. After curing, the PET on the opposite side of the curing was coated with black ink.

Liquid Crystal Device Operation

A 50 Vrms, square wave at 20 Hz was applied to the device to drive the liquid crystal to its reflective state. Applying direct pressure with an object on the clear 5 mil PET side reduced the reflectance of the deformed area, increasing light transmission through the cholesteric liquid crystal material layer forming a dark mark of the transmissive texture in the liquid crystal layer. The black ink layer absorbed the light that passes through the liquid crystal of the mark, creating contrast with the surroundings in the reflective texture of the non-deformed region. To refresh the device back to its initial reflective texture, a 50 Vrms square wave at 20 Hz was applied.

Many modifications and variations will be apparent to those of ordinary skill in the art in light of the foregoing disclosure. Therefore, it is to be understood that, within the scope of the appended claims, the invention can be practiced otherwise than has been specifically shown and described.

What is claimed is:

1. A liquid crystal device comprising:
   a first substrate and a second substrate that are spaced apart from each other, said first substrate being flexible and transparent;

a liquid crystal layer including cholesteric liquid crystal material being disposed between said first substrate and said second substrate;

wherein said cholesteric liquid crystal material is adapted to enable pressure applied by a user to said first substrate, without application of voltage, to change at least a portion of said cholesteric liquid crystal material from a reflective texture to a transmissive texture to form an image.

2. The liquid crystal device of claim 1 comprising a light absorbing background that absorbs light passing through said liquid crystal layer.

3. The liquid crystal device of claim 2 wherein said light absorbing background is comprised of a coating or layer on said second substrate.

4. The liquid crystal device of claim 2 wherein said light absorbing background is opaque or semitransparent.

5. The liquid crystal device of claim 2 wherein said light absorbing background is comprised of an opaque or semitransparent said second substrate.

6. The liquid crystal device of claim 1 wherein said second substrate is flexible and pressure applied by the user to said second substrate changes at least a portion of said cholesteric liquid crystal material from said reflective texture to said transmissive texture.

7. The liquid crystal device of claim 1 comprising a first electrically conductive layer disposed between said first substrate and said liquid crystal layer and a second electrically conductive layer disposed between said second substrate and said liquid crystal layer.

8. The liquid crystal device of claim 7 comprising electronic circuitry adapted to apply an erase voltage to said first electrical conductive layer and said second electrically conductive layer, wherein said electronic circuitry is an integral part of said liquid crystal device.

9. A combination of said liquid crystal device of claim 7 and a separate erasing device that is not permanently connected to said liquid crystal device, said separate erasing device comprising electronic circuitry adapted to apply an erase voltage to said first electrical conductive layer and said second electrically conductive layer.

10. The liquid crystal device of claim 7 wherein said image is erased by applying a voltage to said electrically conductive layers that places said cholesteric liquid crystal material into said reflective texture.

11. The liquid crystal device of claim 7 wherein a cell gap between said first electrically conductive layer and said second electrically conductive layer ranges in size from about 2 microns to about 4 microns.

12. The liquid crystal device of claim 7 wherein said image is erased partially or entirely by flexing that occurs by rolling or scrolling said liquid crystal device.

13. The liquid crystal device of claim 7 wherein said image is erased partially or entirely by flexing that occurs by shaking or flapping said liquid crystal device.

14. The liquid crystal device of claim 7 wherein said image is erased partially or entirely by flexing that occurs by twisting said liquid crystal device.

15. The liquid crystal device of claim 7 wherein said image is erased partially or entirely by flexing that occurs by crumpling said liquid crystal device.

16. The liquid crystal device of claim 7 wherein said image is erased partially or entirely by flexing that occurs by removing said liquid crystal device from contact with an object.

17. The liquid crystal device of claim 1 wherein said cholesteric liquid crystal material comprises cholesteric liquid crystal dispersed in polymer.

18. The liquid crystal device of claim 1 comprising a second liquid crystal layer stacked over said liquid crystal layer.

19. The liquid crystal device of claim 18 comprising at least one middle substrate disposed between said liquid crystal layer and said second liquid crystal layer.

20. The liquid crystal device of claim 18 wherein said second liquid crystal layer includes second cholesteric liquid crystal material, and said cholesteric liquid crystal material and said second cholesteric liquid crystal material have opposite chiral handedness.

21. The liquid crystal device of claim 18 wherein said second liquid crystal layer includes second cholesteric liquid crystal material, and said cholesteric liquid crystal material and said second cholesteric liquid crystal material have different pitch lengths.

22. The liquid crystal device of claim 19 comprising a third electrically conductive layer between said middle substrate and said second liquid crystal layer and a fourth electrically conductive layer between said second substrate and said second liquid crystal layer.

23. The liquid crystal device of claim 1 comprising a stylus that applies said pressure.

24. A liquid crystal device comprising:
a first substrate and a second substrate that are spaced apart from each other, said first substrate being flexible and transparent;
a liquid crystal layer including cholesteric liquid crystal material being disposed between said first substrate and said second substrate;
a light absorbing background that absorbs light passing through said liquid crystal layer;
wherein said cholesteric liquid crystal material is adapted to enable pressure applied by the user to said first substrate, without application of voltage, to form a mark that appears dark where pressure is applied, whereby surroundings appear bright where pressure is not applied.

25. The liquid crystal device of claim 24 comprising a first electrically conductive layer disposed between said first substrate and said liquid crystal layer and a second electrically conductive layer disposed between said second substrate and said liquid crystal layer.

26. The liquid crystal device of claim 25 comprising electronic circuitry adapted to apply an erase voltage to said first electrical conductive layer and said second electrically conductive layer, wherein said electronic circuitry is an integral part of said liquid crystal device.

27. A combination of said liquid crystal device of claim 25 and a separate erasing device that is not permanently connected to said liquid crystal device, said separate erasing device comprising electronic circuitry adapted to apply an erase voltage to said first electrical conductive layer and said second electrically conductive layer.

28. The liquid crystal device of claim 24 wherein said second substrate is flexible and pressure applied by the user to said second substrate changes at least a portion of said cholesteric liquid crystal material from said reflective texture to said transmissive texture.

* * * * *